United States Patent [19]
Seike et al.

[11] Patent Number: 4,921,322
[45] Date of Patent: May 1, 1990

[54] OPTICAL FIBER COMPOSITE INSULATOR

[75] Inventors: Shoji Seike, Nagoya; Noriyasu Oguri, Hashima; Isao Nakajima, Nagoya, all of Japan

[73] Assignee: NGK Insulators, Ltd., Japan

[21] Appl. No.: 329,869

[22] Filed: Mar. 28, 1989

[30] Foreign Application Priority Data

Mar. 28, 1988 [JP] Japan .................................. 63-72029

[51] Int. Cl.⁵ .............................................. G02B 6/36
[52] U.S. Cl. .................................. 350/96.20; 174/139
[58] Field of Search .......................... 350/96.20, 96.23; 174/139

[56] References Cited

U.S. PATENT DOCUMENTS

| | | | |
|---|---|---|---|
| 4,316,204 | 2/1982 | Inagaki et al. | 350/96.20 X |
| 4,490,006 | 12/1984 | Lidholt | 350/96.20 |
| 4,810,836 | 3/1989 | Shinoda et al. | 174/139 |

FOREIGN PATENT DOCUMENTS

| | | |
|---|---|---|
| 105198 | 4/1984 | European Pat. Off. . |
| 2901872 | 7/1980 | Fed. Rep. of Germany . |
| 3544142 | 6/1986 | Fed. Rep. of Germany . |
| 60-158402 | 12/1985 | Japan . |
| 2165958 | 4/1986 | United Kingdom . |

Primary Examiner—John D. Lee
Assistant Examiner—Phan T. Heartney
Attorney, Agent, or Firm—Arnold, White & Durkee

[57] ABSTRACT

An optical fiber composite insulator which including an insulator body having a through-hole formed in its axis portion and at least one optical fiber extending through the through-hole and sealed in the through-hole by an inorganic vitreous sealing material at both end portions of the through-hole. The sealing material has substantially the same thermal expansion coefficient as that of the insulator body, has high resistances against breakage in the power frequency voltage test and in the lightning impulse voltage test, against crack formation in the cooling and heating test, heat proof test and heat cycle test, and against the light-transmission loss.

5 Claims, 6 Drawing Sheets

FIG_1a
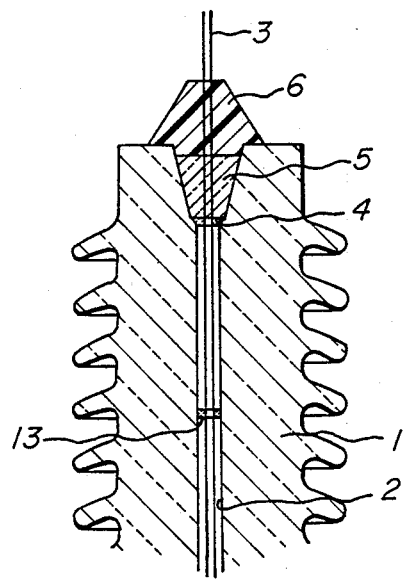
FIG_1b
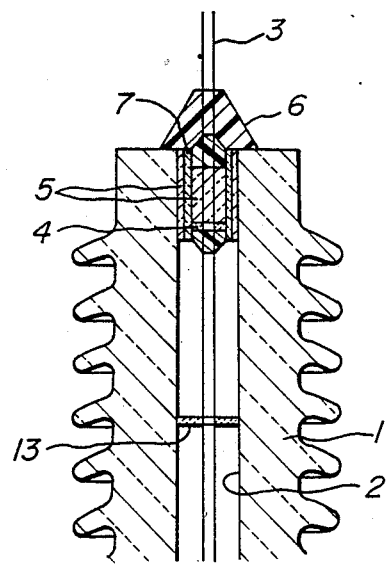

FIG_1c
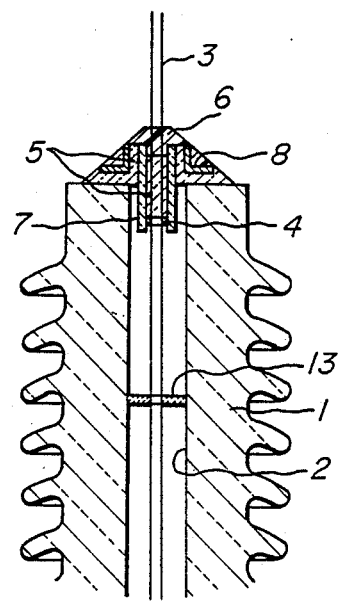
FIG_1d
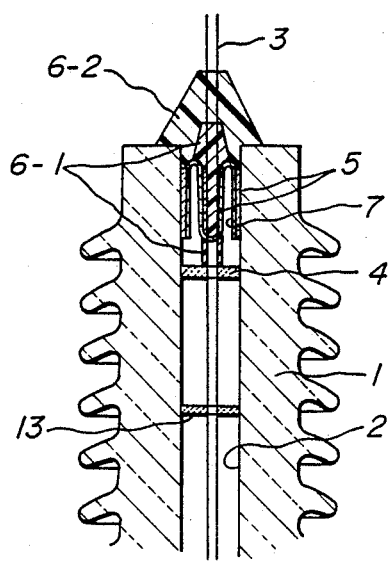

FIG_2a
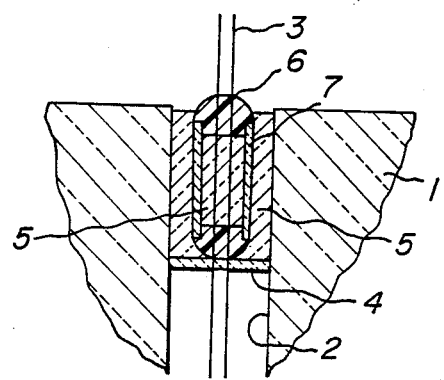
FIG_2b
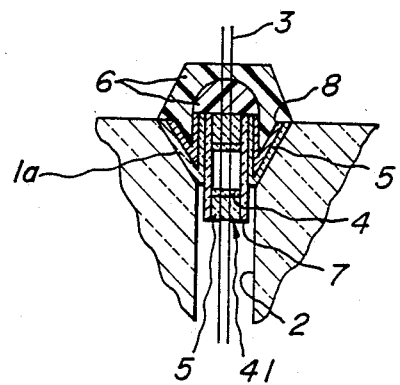

OPTICAL FIBER COMPOSITE INSULATOR

BACKGROUND OF THE INVENTION (1) Field of the Invention

This invention relates to an optical fiber composite insulator predominantly used in the formation of a detection system for fault points in the transmission network, substation and the like, and a method for producing an optical fiber composite insulator.

(2) Related Art Statement

There has hitherto been used an optical fiber composite insulator having a function for transmitting a signal from an optical sensor on the energized side to a detector on the grounding side in order to automatically detect fault points in the electric power system.

Various optical fiber composite insulators have been known. For example, Japanese Patent Laid-open Application No. 60-158,402 discloses a technique, wherein one or two optical fibers are passed through a through-hole formed in the axis portion of an insulator body, and an organic insulating material, such as silicone rubber, epoxy resin or the like, is filled wholly or partly in the through-hole, whereby the optical fiber is sealed to the through-hole and the decrease of the surface leakage-insulating distance of the insulator is prevented, and a technique, wherein the entire porcelain insulator body is previously heated, and a melted glass is flown into the whole or local portion of the through-hole, whereby the optical fiber is sealed to the through-hole.

However, one of the drawbacks of the above described technique is as follows. There is a large difference in the thermal expansion coefficient between the organic material used as a sealing member and the porcelain used as an insulator body, and therefore the sealing of an optical fiber by an organic material has such drawbacks that the sealing material springs out from the through-hole, or the porcelain insulator body is broken by the stress caused in the interior of the insulator body, because of the thermal expansion of an organic material during the heating.

Another drawback of the above described technique is as follows. In the sealing of an optical fiber by the above described inorganic material, a large installation is required in order to heat the entire porcelain insulator body having a large length, and hence an installation cost is too expensive and further a large amount of electric power is consumed. Therefore, the sealing of an optical fiber by an inorganic material is too expensive. Moreover, when the entire insulator body containing an optical fiber extending therethrough is heated in order to melt the glass, the coating of the optical fiber is exfoliated, whereby the optical fiber is easily broken. Consequently, it is difficult to produce an optical fiber composite insulator having such a structure that an optical fiber is protruded from the end portion of a porcelain insulator body.

The object of the present invention is to eliminate the above described drawbacks, and to provide optical fiber composite insulators capable of being produced in a simple manner and having a high reliability and methods for producing the optical fiber composite insulator.

SUMMARY OF THE INVENTION

The first aspect of the present invention lies in an optical fiber composite insulator, comprising an insulator body having a through-hole formed in its axis portion; at least one optical fiber extending through the through-hole; a spacer arranged in the end portion of the through-hole so as to be contacted with the through-hole and holding the optical fiber such that the fiber is passed through the spacer; a sealing glass filled in the through-hole in the end portion of the insulator body; and a resin or rubbery elastomer which covers that portion of the optical fiber which is protruded from the sealing glass.

The second aspect of the present invention lies in an optical fiber composite insulator, comprising an insulator body having a through-hole formed in its axis portion; at least one optical fiber extending through the through-hole; a sealing block arranged in the end portion of the through-hole, said sealing block consisting of a ceramic hollow cylinder, a spacer fitted into the lower end of the hollow cylinder and holding the optical fiber such that the fiber is passed through the spacer and is extended in the hollow cylinder, and a sealing glass filled in the hollow cylinder and holding that portion of the optical fiber which extends outwardly from the spacer; and another sealing glass filled in the gap between the through-hole of the insulator body and the sealing block.

The third aspect of the present invention lies in an optical fiber composite insulator, comprising an insulator body having a through-hole formed in its axis portion; at least one optical fiber extending through the through-hole; a sealing block arranged in the end portion of the through-hole, said sealing block consisting of a ceramic hollow cylinder and a sealing glass which is filled in the hollow cylinder and holds and seals the optical fiber such that the optical fiber is extended through the hollow cylinder and the through-hole; and an electroconductive part consisting of metal or electroconductive ceramics and having an annular sealing portion having a dimension larger than the diameter of the through-hole of the insulator body, said electroconductive part being fitted with the outer peripheral portion of the sealing block; and another sealing glass, which seals tightly the gap between the electroconductive part and the sealing block consisting of a sealing glass and a ceramic hollow cylinder, through which the optical fiber is passed, and the gap between the end portion of the insulator body and the electroconductive part.

The fourth aspect of the present invention lies in an optical fiber composite insulator, comprising an insulator body having a through-hole formed in its axis portion; at least one optical fiber extending through the through-hole; an electroconductive part consisting of metal or electroconductive ceramics and holding the optical fiber such that the optical fiber is passed through the electroconductive part and sealed to the electroconductive part by a sealing glass; another sealing glass which seals tightly the gap between the through-hole of the insulator body and the electroconductive part.

The fifth aspect of the present invention lies in a method for producing an optical fiber composite insulator, comprising passing at least one optical fiber through a through-hole formed in the axis portion of an insulator body, or arranging a sealing block which has previously been produced by passing at least one optical fiber through a ceramic hollow cylinder and sealing the optical fiber with a sealing glass, in the end portion of a through-hole formed in the axis portion of an insulator body; pouring another sealing glass, which has been previously made into a fluidized state by melting with heat, into the gap between the optical fiber and the through-hole of the insulator body in the end portion of the through-hole, or pouring the fluidized sealing glass into the gap between the sealing block and the through-hole of the insulator body; and sealing tightly the gap between the through-hole of the insulator body and the optical fiber in the end portion of the through-hole or the gap between the through-hole of the insulator body and the sealing block with the sealing glass.

The sixth aspect of the present invention lies in a method for producing an optical fiber composite insulator, wherein at least one optical fiber is passed through a through-hole formed in the axis portion of an insulator body and the end portion of the through-hole is sealed, an improvement comprising passing at least one optical fiber through the hole of a ceramic hollow cylinder or the hole of a hollow cylinder made of metal or electroconductive ceramics; sealing tightly the gap between the optical fiber and the inner peripheral portion of the hollow cylinder; applying a sealing glass to the outer peripheral portion of the above treated hollow cylinder or to that end portion of the through-hole of the insulator body which is to be contacted with the cylinder; arranging the cylinder in the end portion of the through-hole of the insulator body; and melting the sealing glass with heat, whereby sealing the gap between the cylinder and the end portion of the through-hole by the sealing glass.

The seventh aspect of the present invention lies in the method for producing an optical fiber composite insulator, wherein at least one optical fiber is passed through a through-hole formed in the axis portion of an insulator body, and the end portion of through-hole is sealed, an improvement comprising passing at least one optical fiber through the hole of a ceramic hollow cylinder or the hole of a hollow cylinder made of metal or electroconductive ceramics; sealing tightly the gap between the optical fiber and the inner peripheral portion of the hollow cylinder with a sealing glass; passing a sealing block, which consists of a sealing glass and a hollow cylinder containing the said optical fiber, through the through-hole of the insulator body and an electroconductive part, which consists of metal or electroconductive ceramics and has such a shape that is to be closely contacted with the hollow cylinder and with the end surface or the through-hole of the insulator body; applying another sealing glass either to an electroconductive part, or to the end portion or the through-hole of the insulator body at the portion to be contacted with the electroconductive part, or to the hollow cylinder containing the said optical fiber at the portion to be contacted with the electroconductive part; and melting the sealing glass with heat, whereby sealing the end portion of the through-hole of the insulator body.

BRIEF DESCRIPTION OF THE DRAWINGS

FIGS. 1a–1d are partial cross-sectional views illustrating the various structures in the optical fiber composite insulator according to the present invention;

FIGS. 2a and 2b are cross-sectional views of the end portion of an insulator body in the optical fiber composite insulator according to the present invention, which illustrate structures other than those illustrated in FIGS. 1a–1d in the end portion of the insulator body;

FIGS. 3a–3c are views illustrating the production steps of the optical fiber composite insulator illustrated in FIG. 1a;

DESCRIPTION OF THE PREFERRED EMBODIMENT

Figure 3C:
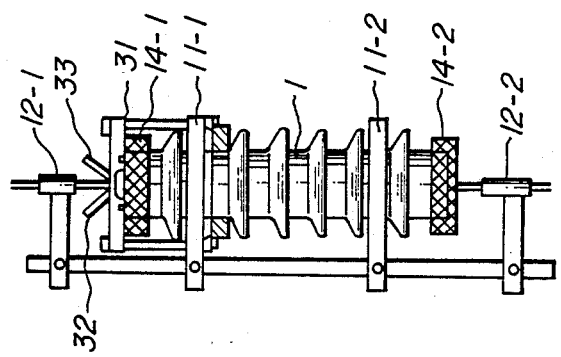

In the optical fiber composite insulator of the present invention, an inorganic glass having substantially the same thermal expansion coefficient as that of the porcelain of insulator body is used as a sealing material. Therefore, the drawbacks in the sealing of an optical fiber to an insulator body with an organic insulating material in the conventional optical fiber composite insulator can be eliminated. Moreover, the through-hole of an insulator body is sealed only in both end portions of the through-hole, and therefore it is not necessary to heat the entire porcelain insulator body, and the drawbacks in the conventional sealing by an inorganic material can be eliminated.

Moreover, when a protecting member for the end portion of insulator body (hereinafter, this protecting member may be called as "end portion-protecting member") consisting of silicone rubber, plastics or the like, is arranged in the surroundings of at least one optical fiber protruded outwardly from the sealing portion by inorganic glass, the exfoliated portion of the coating of the optical fiber can be filled up, and breakage of the optical fiber can be prevented.

Further, the use of an electroconductive part in the sealing portion is preferable because the end portion of the through-hole can be tightly sealed with a sealing glass by the heating of the electroconductive part, that is, by heating the local portion of the insulator body, by means of a so-called high-frequency induction heating.

When a sealing glass is used which consists of a $PbO \cdot B_2O_3$ system glass and having a ratio of A of (thermal expansion coefficient of porcelain of insulator body)/(thermal expansion coefficient of sealing glass) of $1 < A \leq 2.5$, cracks do not occur in the production of an optical fiber composite insulator. Therefore the sealing glass is preferably used as a sealing material.

As the spacer for preventing the flow of melted glass, there can be preferably used a metal plate consisting of any one of Kovar, aluminum, stainless steel, silver and nickel, a porous porcelain, for example, calcined porcelain, or a plate made of an inorganic fiber. Because, these substances are not so different in the thermal expansion coefficient from the above described inorganic sealing glass.

The present invention will be explained in more detail referring to the accompanying drawings.

Each of FIGS. 1a–1d is a cross-sectional view illustrating a structure of one embodiment of the optical fiber composite insulators of the present invention. All of the optical fiber composite insulators of the present invention exemplified in this specification have a structure comprising an insulator body 1 having a through-hole 2 penetrating through its axis portion, and two optical fibers 3 extending through the through-hole 2.

In the embodiment illustrated in FIG. 1a, a sealing block consisting of a spacer 4 for preventing the flow of glass and a sealing glass 5 is arranged in the diameter-enlarging portion 1a in the end portion of the through-hole 2, and further an end portion-protecting member 6 consisting of resin or rubbery elastomer is arranged in the outside of the sealing block in order to protect the optical fibers protruded outwardly through the sealing block. In the embodiment illustrated in FIG. 1b, a spacer 4 and a sealing glass 5 are arranged in a ceramic hollow cylinder 7 or a hollow cylinder 7 made of metal or electroconductive ceramics, both of which cylinders have an outer diameter capable of being inserted into the through-hole 2, both end portions of the above treated hollow cylinder are covered with a heat-resistant resin or the like, and then the hollow cylinder 7 is sealed to the through-hole 2, whereby the end portion of the through-hole is sealed without the formation of a diameter-enlarging portion in the end portion of the through-hole 2. In the embodiment illustrated in FIG. 1c, a ceramic hollow cylinder 7 or a hollow cylinder 7 made of metal or electroconductive ceramics, which contains a spacer 4 and a sealing glass 5 arranged therein, is inserted into a through-hole 2 in the same manner of the embodiment illustrated in FIG. 1b, and is further sealed to an electroconductive part 8 with a sealing glass 5, which electroconductive part 8 consists of metal or conductive ceramics, has a sealing brim larger than the diameter of the through-hole 2, and is arranged around the outer periphery of the sealing block consisting of the hollow cylinder 7, whereby the end portion of the through-hole is sealed.

In the embodiment illustrated in FIG. 1d, a spacer 4 is arranged in the through-hole 2 of an insulator body in the same manner as described in the embodiment illustrated in FIG. 1b, the top portion of a metal 7 or electroconductive ceramics 7 is folded inside to form a hole, a sealing glass 5 is filled in the hole to seal tightly optical fibers 3, and further the metal 7 or electroconductive ceramics 7 is sealed to the through-hole 2 by a sealing glass, and an end portion-protecting member 6 consisting of resin or rubbery elastomer is arranged in the outside of the sealing portion in order to protect the optical fibers 3, whereby the end portion of the through-hole 2 is sealed with the sealing glass and the end portion-protecting member.

FIGS. 2a and 2b are views illustrating structures of end portions other than those illustrated in FIGS. 1a–1d in the optical fiber composite insulators of the present invention. The structure of the end portion of the insulator body illustrated in FIG. 2a is a modification of the structure of the end portion of the insulator body illustrated in FIG. 1a. In the structure illustrated in FIG. 2a, a sealing block, which protects optical fibers 3 therein, is formed by a ceramic hollow cylinder 7 or a hollow cylinder 7 made of metal or electroconductive ceramics, an end portion-protecting member 6 and a sealing glass 5 filled in a hole of the hollow cylinder 7, and this sealing block is sealed in the through-hole 2 with another sealing glass 5 and a spacer 4, which has previously been fitted into the through-hole 2, without the formation of a diameter-enlarging portion. The structure of the end portion of the insulator body illustrated in FIG. 2b is a modification of the structure of the end portion of the insulator body illustrated in FIG. 1d. In the structure illustrated in FIG. 2b, a preliminary sealing member 41, which has been produced by fitting a spacer 4 into the hole of a ceramic hollow cylinder 7 or a hollow cylinder 7 made of metal or electroconductive ceramics, which hollow cylinder 7 contains optical fibers extending therethrough, and sealing the hollow cylinder 7 in the outer side portions of the spacer with a sealing glass 5, is fitted into the end portion of the through-hole 2 of an insulator body, and further an electroconductive part 8 consisting of metal or electroconductive ceramics having a doughnut-shaped and a V-shaped cross-sectional shape is fitted with the preliminary sealing member 41 and is contacted with the diameter-enlarging portion 1a in the end portion of the through-hole 2, and the gap between the electroconductive part 8 and the hollow cylinder 7, which constitutes the preliminary sealing member 41, and the gap between the electroconductive part 8 and the diameter-enlarging portion 1a in the end portion of the through-hole 2 are tightly sealed with a sealing glass 5, and the exposed ends of the preliminary sealing member 41 and the electroconductive part 8 are protected by an end portion-sealing member 6 consisting of resin or rubbery elastomer.

The production method for the optical fiber composite insulators of the present invention having the above described structure will be explained hereinafter.

Figure 3B:
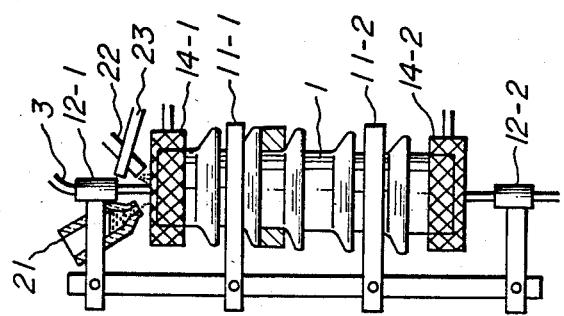
Figure 3A:
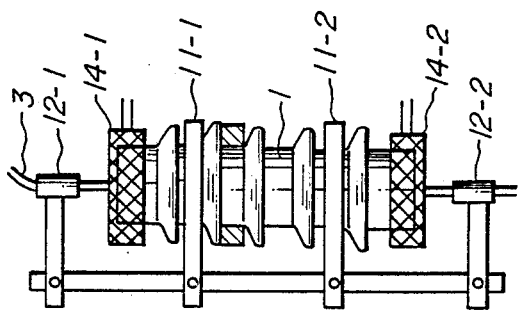

FIGS. 3a–3c are explanatory views illustrating the production steps of the optical fiber composite insulator of the present invention illustrated in FIG. 1a. FIG. 3a illustrates a preliminarily heating step, FIG. 3b illustrates a sealing step with glass, and FIG. 3c illustrates a step for pouring an end portion-protecting member.

In the preliminarily heating step illustrated in FIG. 3a, an insulator body 1 and optical fibers 3 are fixed by means of insulator body-fixing jigs 11-1 and 11-2, and optical fiber-fixing jigs 12-1 and 12-2, respectively. These jigs are constructed so that the intervals of these jigs in the upper and lower direction and in the left and right directions can be adjusted depending upon the positions of the insulator body 1 and optical fibers 3. In this case, it is necessary that, prior to the fixing of the optical fibers 3 by the jigs 12-1 and 12-2, a spacer 4 for stopping the flow of glass, a spacer 13 for fixing the optical fibers 3 in the through-hole 2, and the like are previously arranged in the upper end portion and in the lower end portion of the insulator body 1 as illustrated in FIG. 1a. Then, the optical fiber-fixing jigs 12-1 and 12-2 are moved downwardly, and the coating of the optical fibers 3 is peeled off at their predetermined position in the lower end portion by means of a blowing of hot air or other means. Further, the optical fiber-fixing jigs 12-1 and 12-2 are moved upwardly and the coating of the optical fibers 3 are peeled off at their predetermined position in the upper end portion in the same manner as described above. This hot air blowing treatment and the like are carried out in order that a glass-sealing portion will be formed at the portion, at which the coating of optical fibers has been peeled off by the hot air blowing and the like. Finally, preliminary heaters 14-1 and 14-2 are arranged at both end portions of the insulator body 1, and both the end portions of the insulator body 1 are heated, for example, under a condition of 200° C.×30 minutes.

In the sealing step with glass illustrated in FIG. 3b, one end portion, for example, the upper end portion, of the through-hole 2 is first sealed. That is, a glass melting furnace 21 by means of high frequency induction heating, a hot air-blowing pipe 22 and a cooling pipe 23 are arranged in the vicinity of the upper end portion of the insulator body 1. Then, hot air kept at, for example, 550°±20° C. is blown to the insulator body 1 for 5 minutes through the hot air-blowing pipe 22 to heat the end portion of the insulator body 1, and then a sealing glass 5 which has a given composition and has been melted, for example, at 500° C. in the glass melting furnace 21 by means of high frequency induction heating, is poured into the end portion of through-hole 2. The sealing glass 5 is poured into the end portion of through-hole 2 up to the given amount, and then the sealing glass 5 is solidified, whereby a sealing operation at the upper end portion of the insulator body is finished. After the sealing of the upper end portion is finished, the above treated insulator is turned, and a sealing glass is poured into the lower end portion of the through-hole 2 in the same manner as described above, whereby the sealing operation in both ends is finished. The cooling pipe 23 is used in order to prevent the heating of the optical fiber-fixing jigs 12-1 and 12-2.

The insulator body 1, after the glass sealing step is finished, is subjected to a cooling of the sealing glass at a cooling rate of, for example, 50° C./hr while heating the insulator body 1 by means of preliminary heaters 14-1 and 14-2 similarly to the preliminarily heating step illustrated in FIG. 3a. This cooling is carried out until the surface temperature of the sealing glass is cooled to about 80°±10° C. and then the cooling is stopped.

The insulator body 1, after the above sealing and cooling in both end portions have been finished, is moved to a step for pouring an end portion-protecting member illustrated in FIG. 3c. In the step for pouring an end portion-protecting member, such as silicone rubber and/or the like, a pouring jig 31 for pouring silicone rubber or the like is arranged in the end portion of an insulator body 1, the interior of the jig 31 is sucked under vacuum through a suction port 32, and then the silicone rubber and/or the like is poured into the interior of the jig 31 through an inlet 33. When the whole vacant space in the jig 31 is filled up by the silicone rubber and/or the like, the pouring operation is finished. Then, the silicone rubber is cured by heating it, for example, at 80° C. for 2 hours by means of a preliminary heater 14-1. A Similar silicone rubber-pouring step is carried out in the other end portion as well, whereby an end portion-protecting member 6 as illustrated in FIGS. 1a–1d is formed.

Figure 4A:
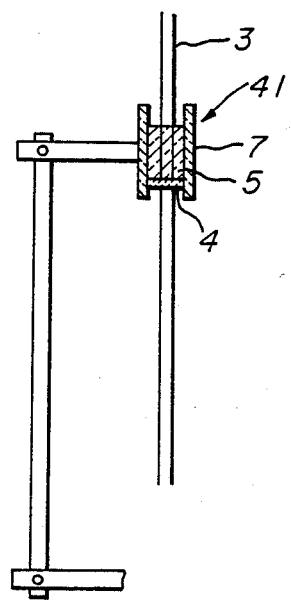
FIGS. 4a and 4b are views illustrating the production steps of the optical fiber composite insulators illustrated in FIGS. 1b and 1c.
Figure 4B:
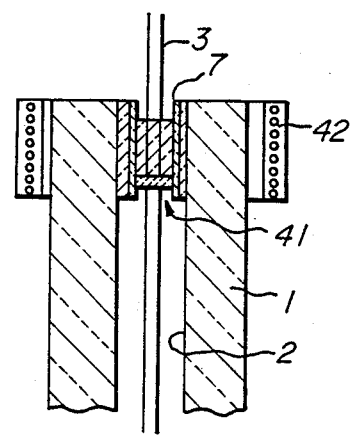
Figure 5:
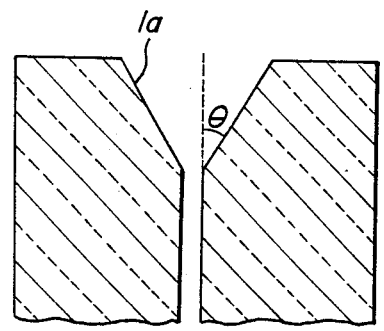
FIG. 5 is a view for explaining the inclined angle $\theta$ of the wall of the diameter-enlarging portion of the through-hole with respect to the center axis.

FIGS. 4a and 4b are explanative views illustrating the each production step of an optical fiber composite insulators illustrated in FIGS. 1b, 1c and 1d according to the present invention. In these embodiments, FIG. 4a illustrates a step for forming a preliminary sealing member 41, and FIG. 4b illustrates a glass sealing step. In the preliminary sealing member-forming step illustrated in FIG. 4a, a spacer 4 and a sealing glass 5 are arranged in a ceramic hollow cylinder 7 or a hollow cylinder 7 made of electroconductive ceramics or metal, both of which hollow cylinders have an outer diameter capable of being inserted into the through-hole 2 of the insulator body 1, at the position corresponding to the sealing portion of the optical fibers 3, for example, in the same manner as described in the sealing step 3b in the production steps illustrated in FIGS. 3a–3c, whereby the preliminary sealing member 41 is formed.

Then, as illustrated in FIG. 4b, optical fibers 3 having the above described preliminary sealing member 41 arranged surrounding the fibers 3 is passed through the through-hole 2 of the insulator body 1 such that the preliminary sealing member 41 is positioned at the end portion of the insulator body 1. In this case, it is necessary that a sealing glass 5, preferably in the form of paste, is interposed between the outer peripheral surface of the hollow cylinder 7 of the preliminary sealing member 41 and the inner peripheral surface of the through-hole 2 of the insulator body 1 in the case where an optical fiber composite insulator illustrated in FIG. 1b is produced, or is interposed between a part of the outer peripheral surface of the hollow cylinder 7 and the electroconductive part 8 made of electroconductive ceramics or metal and between the end surface of the insulator body 1 and the electroconductive material 8 in the case where an insulator illustrated in FIG. 1c is produced. Then, a high frequency induction heating apparatus 42 is arranged in the portion corresponding to the end portion of the insulator body 1 as illustrated in FIG. 4b, and the end portion is heated by a high-frequency induction current. In this case, in the production of the insulator illustrated in FIG. 1b, when the hollow cylinder 7 is made of electroconductive ceramics or metal, the hollow cylinder 7 is heated by the high-frequency induction current, whereby the sealing glass 5, which consists of a vitreous bonding agent and is interposed between the outer peripheral surface of the hollow cylinder 7 of the preliminary sealing member 41 and the inner peripheral surface of the through-hole 2 of the insulator body 1, is melted and the sealing operation can be finished. In the production of the insulator illustrated in FIG. 1c, the electroconductive part 8 is heated by a high frequency induction current to melt the sealing glass 5, whereby the sealing operation can be finished. In the production of the insulators illustrated in FIGS. 1b and 1c also, after the above described treatments, an end portion-protecting member made of silicone rubber or the like is formed by the same treatment step as illustrated in FIG. 3c.

The following example is given for the purpose of illustration of this invention and is not intended as a limitation thereof.

EXAMPLE

Optical fiber composite insulators having structures illustrated in FIGS. 1a–1d were produced according to the above described methods under the following conditions. Two kinds of insulator bodies having thermal expansion coefficients shown in Table 1, sealing glasses 5 having properties shown in Table 2, and hollow cylinder 7 having properties shown in Table 3 were used. The inclination angle $\theta$, with respect to the center axis, of the wall of the diameter-enlarging portion 1a in the end portion of the through-hole was varied as shown in Table 4. Protecting members shown in Table 5 were used for protecting the diameter-enlarging portion 1a in the end portion of the through-hole. Electroconductive parts shown in Table 6 were used.

TABLE 1

| Insulator body | A | B |
|---|---|---|
| Thermal expansion coefficient ($\times 10^{-7}$/°C.) | 74 | 56 |

TABLE 2

| Sealing glass | A | B | C | D | E | F |
|---|---|---|---|---|---|---|
| Thermal expansion coefficient ($\times 10^{-7}$/°C.) | 47 | 35 | 80 | 66 | 58 | 67 |
| Melting temperature (°C.) | 420 | 420 | 420 | 450 | 460 | 450 |
| Main components | PbO, B$_2$O$_3$, TiO$_2$, ZrO$_2$ | | PbO, B$_2$O$_3$, TiO$_2$, ZrO$_2$, ZnO, SiO$_2$ | | PbO, B$_2$O$_3$, SiO$_2$, Al$_2$O$_3$, LiO$_2$ | |

TABLE 3

| Hollow cylinder | Glass (Pyrex) | Alumina | Porcelain | Metal A | Metal B |
|---|---|---|---|---|---|
| Thermal expansion coefficient ($\times 10^{-7}/°C$) | 30 | 80 | 55 | 50 | 160 |

TABLE 4

| $\theta$ (°) | 0 | 10 | 30 | 45 | 60 |
|---|---|---|---|---|---|

TABLE 5

| A | B | C |
|---|---|---|
| Silicone rubber | Polyurethane rubber | Epoxy resin |

TABLE 6

| Electroconductive part | Kovar | Copper |
|---|---|---|
| Thermal expansion coefficient ($\times 10^{-7}/°C$) | 30 | 160 |

The resulting optical fiber composite insulators having structures illustrated in FIGS. 1a–1d were subjected to the tests shown in the following Table 7 according to the test conditions described in Table 7.

TABLE 7

| Test items | Test conditions | Remarks |
|---|---|---|
| Power frequency voltage test | Impressed voltage: 300 Kv (80% value of flashover voltage), 1 min | According to JIS C3818 |
| Lightning impulse voltage test | Impressed voltage: 500 Kv, Impulse voltage waveform: 1 × 40 μs Number of voltage impressions: 15 (both of plus and minus, respectively) | |
| Thermal shock test | Temperature difference: 90° C., Cold water temperature: 0° C. Immersed time: 15 min, | Formation of cracks was observed |
| Heat proof test | Number of immersed time: 5 Heating temperature: 60–160° C. (20° C. interval) Constant temperature time: 3 hrs. Heating rate: 100° C./hr | Formation of cracks was observed |
| Light-transmission loss test | (a) Commercial frequency voltage impression: impressed voltage: 300 Kv, 1 min | (a) After a power frequency voltage was impressed to a sample insulator, |
| | (b) Lightning impulse voltage impression: impressed voltage: 500 Kv | (b) after a lightning impulse voltage was impressed to a sample insulator, or |
| | (c) Varied temperature: temperature range: −20° C.~140° C. (20° C. interval) Constant temperature time: 3 hrs. | (c) a sample insulator was heat treated according to the temperature variation schedule, the decreased value from the initial value was measured |
| Heat cycle test | Low temperature: −20° C., High temperature: 90° C., 100 cycles Constant temperature time: 3 hrs. | Formation of cracks was observed |

Table 8 shows the results of the tests for the optical fiber composite insulator having a structure illustrated in FIG. 1(a); Table 9 shows the results of the tests for the optical fiber composite insulators having structures illustrated in FIGS. 1b and 1d; and Table 10 shows the results of the tests for the optical fiber composite insulator having a structure illustrated in FIG. 1c. In the above tables, the mark "O" indicates that the sample composite insulator is excellent, the mark "X" indicates that the sample composite insulator is poor, and the mark "-" indicates that tests have not been effected.

TABLE 8

| Sample No. | Insulator body | Sealing glass | Shape of the end portion of through hole ($\theta$) (°) | End portion-protecting member | Resistance against crack formation after the firing | Resistance against crack formation after the thermal shock test | Resistance against crack formation after the heat cycle test |
|---|---|---|---|---|---|---|---|
| 8-1 | A | A | 0 | silicone | O | O | O |
| 8-2 | | | | polyurethane | O | O | O |
| 8-3 | | | | epoxy resin | O | O | O |
| 8-4 | | | 10 | silicone | O | O | O |
| 8-5 | | | 30 | rubber | O | O | O |
| 8-6 | | | 45 | | O | O | O |
| 8-7 | | | 60 | | O | O | O |
| 8-8 | | B | 0 | | O | O | O |
| 8-9 | | | 30 | | O | O | O |
| 8-10 | | | 60 | | O | O | O |
| 8-11 | | C | 0 | | O | X | — |
| 8-12 | | | 30 | | O | X | — |
| 8-13 | | | 60 | | O | X | — |
| 8-14 | | D | 0 | | O | O | O |
| 8-15 | | | 30 | | O | O | O |
| 8-16 | | | 60 | | O | O | O |
| 8-17 | | E | 0 | | O | O | O |
| 8-18 | | | 30 | | O | O | O |
| 8-19 | | | 60 | | O | O | O |
| 8-20 | | F | 0 | | O | O | O |

TABLE 8-continued

| Sample No. | Insulator body | Sealing glass | Shape of the end portion of through hole (θ) (°) | End portion-protecting member | Resistance against crack formation after the firing | Resistance against crack formation after the thermal shock test | Resistance against crack formation after the heat cycle test |
|---|---|---|---|---|---|---|---|
| 8-21 | | | 30 | | O | O | O |
| 8-22 | | | 60 | | O | O | O |

TABLE 9

| Sample No. | Insulator body | Sealing glass | Material of hollow cylinder | End portion-protecting member | Resistance against crack formation after the firing | Resistance against crack formation after the thermal shock test | Resistance against crack formation after the heat cycle test | Remarks (structure) |
|---|---|---|---|---|---|---|---|---|
| 9-1 | A | A | glass | silicone | X | — | — | FIG. 1b |
| 9-2 | | | alumina | | O | O | O | |
| 9-3 | | | porcelain | | O | O | O | |
| 9-4 | | | | polyurethane | O | O | O | |
| 9-5 | | | | epoxy resin | O | O | O | |
| 9-6 | | | metal A | silicone | O | O | O | |
| 9-7 | | | metal B | rubber | X | — | — | |
| 9-8 | | B | alumina | | O | O | O | |
| 9-9 | | | porcelain | | O | O | O | |
| 9-10 | | | metal A | | O | O | O | FIG. 1d |
| 9-11 | | C | alumina | | O | O | O | FIG. 1b |
| 9-12 | | | porcelain | | O | O | O | |
| 9-13 | | | metal A | | O | O | O | FIG. 1d |
| 9-14 | | D | alumina | | O | O | O | FIG. 1b |
| 9-15 | | | porcelain | | O | O | O | |
| 9-16 | | | metal A | | O | O | O | FIG. 1d |
| 9-17 | | E | alumina | | O | O | O | FIG. 1b |
| 9-18 | | | porcelain | | O | O | O | |
| 9-19 | | | metal A | | O | O | O | |
| 9-20 | | F | alumina | | O | O | O | |
| 9-21 | | | porcelain | | O | O | O | |
| 9-22 | | | metal A | | O | O | O | |

TABLE 10

| Sample No. | Insulator body | Sealing glass | Material of hollow cylinder | Electro-conductive part | End portion-protecting member | Resistance against crack formation after the firing | Resistance against crack formation after the thermal shock test | Resistance against crack formation after the heat cycle test |
|---|---|---|---|---|---|---|---|---|
| 10-1 | A | A | alumina | Kovar | silicone | O | O | O |
| 10-2 | | | porcelain | | | O | O | O |
| 10-3 | | | | | polyurethane | O | O | O |
| 10-4 | | | | | epoxy resin | O | O | O |
| 10-5 | | | | copper | | X | X | X |
| 10-6 | | | metal A | Kovar | silicone | O | O | O |
| 10-7 | | | metal B | | rubber | X | X | X |
| 10-8 | | B | alumina | | | O | O | O |
| 10-9 | | | porcelain | | | O | O | O |
| 10-10 | | | metal A | | | O | O | O |
| 10-11 | | C | alumina | | | O | O | O |
| 10-12 | | | porcelain | | | O | O | O |
| 10-13 | | | metal A | | | O | O | O |
| 10-14 | | D | alumina | | | O | O | O |
| 10-15 | | | porcelain | | | O | O | O |
| 10-16 | | | metal A | | | O | O | O |
| 10-17 | | E | alumina | | | O | O | O |
| 10-18 | | | porcelain | | | O | O | O |
| 10-19 | | | metal A | | | O | O | O |
| 10-20 | | F | alumina | | | O | O | O |
| 10-21 | | | porcelain | | | O | O | O |
| 10-22 | | | metal A | | | O | O | O |
| 10-23 | B | A | alumina | | | O | O | O |

TABLE 10-continued

| Sample No. | Insulator body | Sealing glass | Material of hollow cylinder | Electroconductive part | End portion-protecting member | Resistance against crack formation after the firing | Resistance against crack formation after the thermal shock test | Resistance against crack formation after the heat cycle test |
|---|---|---|---|---|---|---|---|---|
| 10-24 | | | porcelain | | | O | O | O |
| 10-25 | | | metal A | | | O | O | O |
| 10-26 | | C | alumina | | | X | — | — |
| 10-27 | | | porcelain | | | X | — | — |
| 10-28 | | | metal A | | | X | — | — |
| 10-29 | | D | alumina | | | O | X | — |
| 10-30 | | | porcelain | | | O | X | — |
| 10-31 | | | metal A | | | O | X | — |
| 10-32 | | E | alumina | | | O | O | O |
| 10-33 | | | porcelain | | | O | O | O |
| 10-34 | | | metal A | | | O | O | O |

It can be seen from Table 8, which shows the results of the tests for the optical fiber composite insulator having a structure illustrated in FIG. 1a, that, in the optical fiber composite insulators other than sample Nos. 8-11~8-13, wherein the thermal expansion coefficient of the sealing glass is higher than that of the insulator body, even when various conditions, such as the inclination angle θ of the wall of the diameter-enlarging portion in the end portion of the through-hole, the material of the end portion-protecting member and/or the like, are changed, good results are obtained.

It can be seen from Table 9, which shows the results of the test for the optical fiber composite insulators having structures illustrated in FIGS. 1b and 1d, that, in the optical fiber composite insulators other than sample Nos. 9-1 and 9-7, wherein the sealing glass is remarkably different from the material of the hollow cylinder in the thermal expansion coefficient, good test results are obtained even when various conditions changed.

Further, it can be seen from Table 10, which shows the results of the tests for the optical fiber composite insulator having a structure illustrated in FIG. 1c, that, in the optical fiber composite insulators other than sample Nos. 10-5, 10-7, and 10-26~10-31, wherein the thermal expansion coefficient of the insulator body is different from that of the sealing glass or there is a difference in the thermal expansion coefficient between the sealing glass, the material of the hollow cylinder and the electroconductive part, good test results are obtained even when various conditions are changed.

Further, the optical fiber composite insulators having structures illustrated in FIGS. 1a–1d were subjected to tests other than the above described tests in the tests shown in Table 7. The obtained results are shown in the following Table 11.

TABLE 11(a)

| Sample No. | Insulator body | Sealing glass | Shape of the end portion of through-hole (θ) (°) | Material of hollow cylinder | Electroconductive part | End portion-protecting member | Resistance against crack formation after the firing | Resistance against breakage after the lightning impulse voltage test | Resistance against crack formation after the thermal shock test | Resistance against crack formation after the heat cycle test |
|---|---|---|---|---|---|---|---|---|---|---|
| 11-1 | A | B | 0 | — | — | silicone | O | O | O | O |
| 11-2 | A | A | — | porcelain | — | Kovar | O | O | O | O |
| 11-3 | | E | — | — | | polyurethane rubber | O | O | O | O |
| 11-4 | B | A | — | — | | silicone | O | O | O | O |
| 11-5 | | A | — | — | | silicone | O | O | O | O |

TABLE 11(b)

| Sample No. | Resistance against crack formation during heat proof test Heating temperature | | | | | |
|---|---|---|---|---|---|---|
| | 60° C. | 80° C. | 100° C. | 120° C. | 140° C. | 160° C. |
| 11-1 | O | O | O | O | O | O |
| 11-2 | O | O | O | O | O | O |
| 11-3 | O | O | O | O | O | O |
| 11-4 | O | O | O | O | O | O |
| 11-5 | O | O | O | O | O | O |

| Sample No. | Resistance against light-transmission loss | | | Remarks (structure) |
|---|---|---|---|---|
| | Resistance after breakage after the impression of power frequency voltage | Resistance against breakage after the impression of lightning impulse voltage | Temperature variation −20° C. 0 60° C. 100° C. 120° C. 140° C. | |

TABLE 11(b)-continued

| 11-1 | O | O | O | O | O | O | O | O | FIG. 1a |
|---|---|---|---|---|---|---|---|---|---|
| 11-2 | O | O | O | O | O | O | O | O | FIG. 1b |
| 11-3 | O | O | O | O | O | O | O | O | FIG. 1c |
| 11-4 | O | O | O | O | O | O | O | O | |
| 11-5 | O | O | O | O | O | O | O | O | FIG. 1d |

It can be seen from the results shown in Table 11 that the optical fiber composite insulators having structures illustrated in FIGS. 1a–1d according to the present invention have exhibited excellent properties in all test items.

Figure 6:
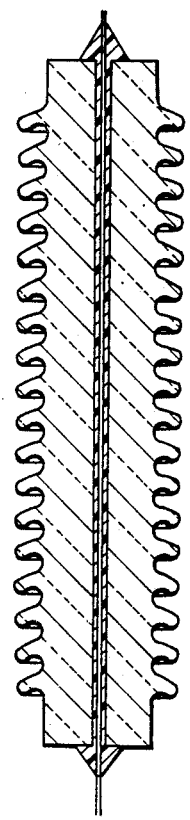
FIG. 6 is a view for illustrating one embodiment of conventional optical fiber composite insulator.

For comparison, a conventional optical fiber composite insulator having a structure illustrated in FIG. 6, wherein the end portion of an insulator body and the whole of the through-hole are sealed with an organic sealing material, was produced, and the same tests as described above were effected. The obtained results are shown in the following Table 12.

TABLE 12

| Sample No. | Sealing material | Resistance against crack formation after the thermal shock test | Resistance against crack formation after the heat cycle test | Resistance against crack formation after the heat proof test Heating temperature | | | | | |
|---|---|---|---|---|---|---|---|---|---|
| | | | | 60° C. | 80° C. | 100° C. | 120° C. | 140° C. | 160° C. |
| 12-1 | Silicone rubber | X | X | O | X | | | | |
| 12-2 | Polyurethane rubber | O | X | O | O | O | X | | |
| 12-3 | Epoxy resin | O | X | O | O | O | O | O | O |

As described above, in the present invention, inorganic glass having substantially the same thermal expansion coefficient as that of the porcelain of insulator body is used as a sealing agent, whereby problems, such as cracks of the insulator body and the like, have been solved. Moreover, the insulator body is sealed only in both ends of its through-hole, and hence the sealing can be carried out without heating of whole of the insulator body. Therefore, according to the present invention, an optical fiber composite insulator can be produced inexpensively.

What is claimed is:

1. An optical fiber composite insulator, comprising an insulator body having a through-hole formed in its axis portion; at least one optical fiber extending through the through-hole; a spacer arranged in at least one end portion of the through-hole to contact the through-hole and hold the optical fiber such that the fiber is passed through the spacer; a sealing glass filled in the through-hole in the end portion of the insulator body; and a resin or rubbery elastomer which covers that portion of the optical fiber which is protruded from the sealing glass.

2. An optical fiber composite insulator, comprising an insulator body having a through-hole formed in its axis portion, at least one optical fiber extending through the through-hole; a sealing block arranged in at least one end portion of the through-hole, said sealing block consisting of a ceramic hollow cylinder, a spacer fitted into the lower end of the hollow cylinder and holding the optical fiber such that the fiber is passed through the spacer and extended in the hollow cylinder, and a sealing glass filled in the hollow cylinder and holding that portion of the optical fiber which extends outwardly from the spacer; and another sealing glass filled in a gap between the through-hole of the insulator body and the sealing block.

3. An optical fiber composite insulator according to claim 2, further comprising a resin or rubbery elastomer which covers both ends of the through-hole.

4. An optical fiber composite insulator, comprising an insulator body having a through-hole formed in its axis portion; at least one optical fiber extending through the through-hole; a sealing block arranged in at least one end portion of the through-hole, said sealing block consisting of a ceramic hollow cylinder and a sealing glass which is filled in the hollow cylinder and holds and seals the optical fiber such that the optical fiber is extended through the hollow cylinder and the through-hole; and an electroconductive part consisting of metal or electroconductive ceramics and having an annular sealing portion having a dimension larger than the diameter of the through-hole of the insulator body, said electroconductive part being fitted with the outer peripheral portion of the sealing block; and another sealing glass, which tightly seals a gap between the end portion of the insulator body and the sealing block consisting of a sealing glass and a ceramic hollow cylinder, through which the optical fiber is passed, and a gap between the end portion of the insulator body and the electroconductive part.

5. An optical fiber composite insulator, comprising an insulator body having a through-hole formed in its axis portion; at least one optical fiber extending through the through-hole; an electroconductive part consisting of metal or electroconductive ceramics, said part holding the optical fiber such that the optical fiber is passed through the electroconductive part and sealed to the electroconductive part by a sealing glass; and another sealing glass which tightly seals a gap between the through-hole of the insulator body and the electroconductive part.

* * * * *